(12) United States Patent
Ha et al.

(10) Patent No.: US 8,069,581 B2
(45) Date of Patent: Dec. 6, 2011

(54) SYSTEM FOR PURIFYING CONTAMINATED SOIL

(76) Inventors: Sang Ahn Ha, Busan (KR); Hyuk Mok Choi, Pohang-si (KR)

(*) Notice: Subject to any disclaimer, the term of this patent is extended or adjusted under 35 U.S.C. 154(b) by 667 days.

(21) Appl. No.: 12/190,953

(22) Filed: Aug. 13, 2008

(65) Prior Publication Data

US 2009/0145000 A1   Jun. 11, 2009

(30) Foreign Application Priority Data

Dec. 10, 2007   (KR) .................. 10-2007-0127630

(51) Int. Cl.
*F26B 17/00*   (2006.01)
*F26B 23/08*   (2006.01)

(52) U.S. Cl. ............. 34/72; 34/73; 34/75; 34/79; 34/86; 34/130; 34/261; 34/573

(58) Field of Classification Search ................ 34/72, 73, 34/75, 76, 77, 78, 79, 86, 259, 261, 108, 34/130, 131, 573; 110/224, 226, 229; 588/321
See application file for complete search history.

(56) References Cited

U.S. PATENT DOCUMENTS

| | | | | |
|---|---|---|---|---|
| 5,056,541 A | * | 10/1991 | Schade et al. | 134/25.1 |
| 5,253,597 A | * | 10/1993 | Swanstrom et al. | 110/346 |
| 5,264,654 A | * | 11/1993 | Kreft et al. | 588/316 |
| 6,996,918 B2 | * | 2/2006 | Bsirske et al. | 34/265 |

FOREIGN PATENT DOCUMENTS

JP   2004008872 A   *   1/2004

* cited by examiner

*Primary Examiner* — Jiping Lu
(74) *Attorney, Agent, or Firm* — IPLA P.A.; James E. Bame

(57) ABSTRACT

Disclosed herein is a system for purifying contaminated soil, which restores soil contaminated by a variety of pollutants to the condition before the contamination, and which itself provides the driving source required for the purification. The system includes: a dryer which dries contaminated soil, separates waste gas generated during the drying from the contaminated soil, and discharges the waste gas; a pyrolysis apparatus which indirectly heats the dried contaminated soil in a hermetic condition to divide the contaminated soil into purified soil and pyrolysis gas, and separately discharges the purified soil and the pyrolysis gas; a transfer fan for forcibly transferring the discharged pyrolysis gas; a burner for oxidizing the waste gas discharged from the dryer and the pyrolysis gas forcibly transferred by the transfer fan, to heat the pyrolysis apparatus; and a cooling facility for directly spraying cooling water on the discharged purified soil to cool the purified soil.

5 Claims, 2 Drawing Sheets

SYSTEM FOR PURIFYING CONTAMINATED SOIL

CROSS REFERENCE

This application claims foreign priority under Paris Convention and 35 U.S.C. §119 to Korean Patent Application No. 10-2007-0127630, filed Dec. 10, 2007 with the Korean Intellectual Property Office.

BACKGROUND OF THE INVENTION

1. Field of the Invention

The present invention relates generally to a system for purifying contaminated soil, and, more particularly, to a system for purifying soil contaminated soil, which is designed to restore soil contaminated by a variety of oils, heavy metals, organic wastes, etc., to the condition before the contamination, and which itself provides a driving source required for the purification.

2. Description of the Related Art

With the development of sciences and technology, human civilization has correspondingly developed, and thus the human cultural environment has been highly improved. However, such development entails the generation of a variety of contamination and waste, and the contamination and waste destroy the natural environment, thus deteriorating the ecosystem.

Accordingly, in order to improve the ecosystem, human beings have researched a method of reducing the amount of contamination and waste, as well as realizing a method of efficiently treating the contamination and the waste.

The contamination and the waste, when illegally dumped on the ground or buried in the ground, cause contamination of the ground. Of course, soil has a natural self-purifying function. However, the natural purification of soil requires an excessively long purification period, and the soil loses its natural self-purifying capability in the case where it is severely contaminated, and thus it is not sufficiently capable of handling today's soil contamination.

In the past, a process of artificially purifying contaminated soil using a thermal desorption system was used.

The term "thermal desorption system" used herein refers to an apparatus for separating and eliminating contaminants contained in a contaminated medium, i.e., soil, through a thermal desorption reaction. More specifically, the thermal desorption system applies direct heat at a high temperature to the contaminated soil to burn the contaminated materials in the soil.

However, since the conventional thermal desorption system directly heats contaminated soil in the air to separate and oxidize contaminated materials contained in the soil, there is a problem in that moisture in the soil and water vapor in the air hinder the combustion of the contaminated materials, thus causing incomplete combustion of the contaminated materials contained in the soil. Furthermore, since incomplete combustion produces a large quantity of exhaust gas containing various contaminated materials, and the exhaust gas contains environmental pollutants, which play a role in atmospheric pollution, there is a severe problem in that the atmospheric pollution becomes worse despite the use of the thermal desorption system in the purification of contaminated soil.

SUMMARY OF THE INVENTION

Accordingly, the present invention has been made keeping in mind the above problems occurring in the prior art, and an object of the present invention is to provide a system for purifying contaminated soil, which is intended to suppress the generation of exhaust gas, which is a source of air pollution, during a process of purifying soil by heating it, thus realizing an efficient purification operation.

In order to accomplish the above object, the present invention provides a system for purifying contaminated soil, including: a dryer, which dries contaminated soil, separates waste gas, generated during the drying, from the contaminated soil and discharges the waste gas; a pyrolysis apparatus which indirectly heats the dried contaminated soil in a hermetic condition to divide the contaminated soil into purified soil and pyrolysis gas, and separately discharges the purified soil and the pyrolysis gas; a transfer fan for forcibly transferring the discharged pyrolysis gas; a burner for oxidizing the waste gas discharged from the dryer and the pyrolysis gas forcibly transferred from the transfer fan, to heat the pyrolysis apparatus; and a cooling facility for directly spraying cooling water on the discharged purified soil to cool the purified soil.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the invention is described in greater detail with reference to the accompanying drawing.

Figure 1:
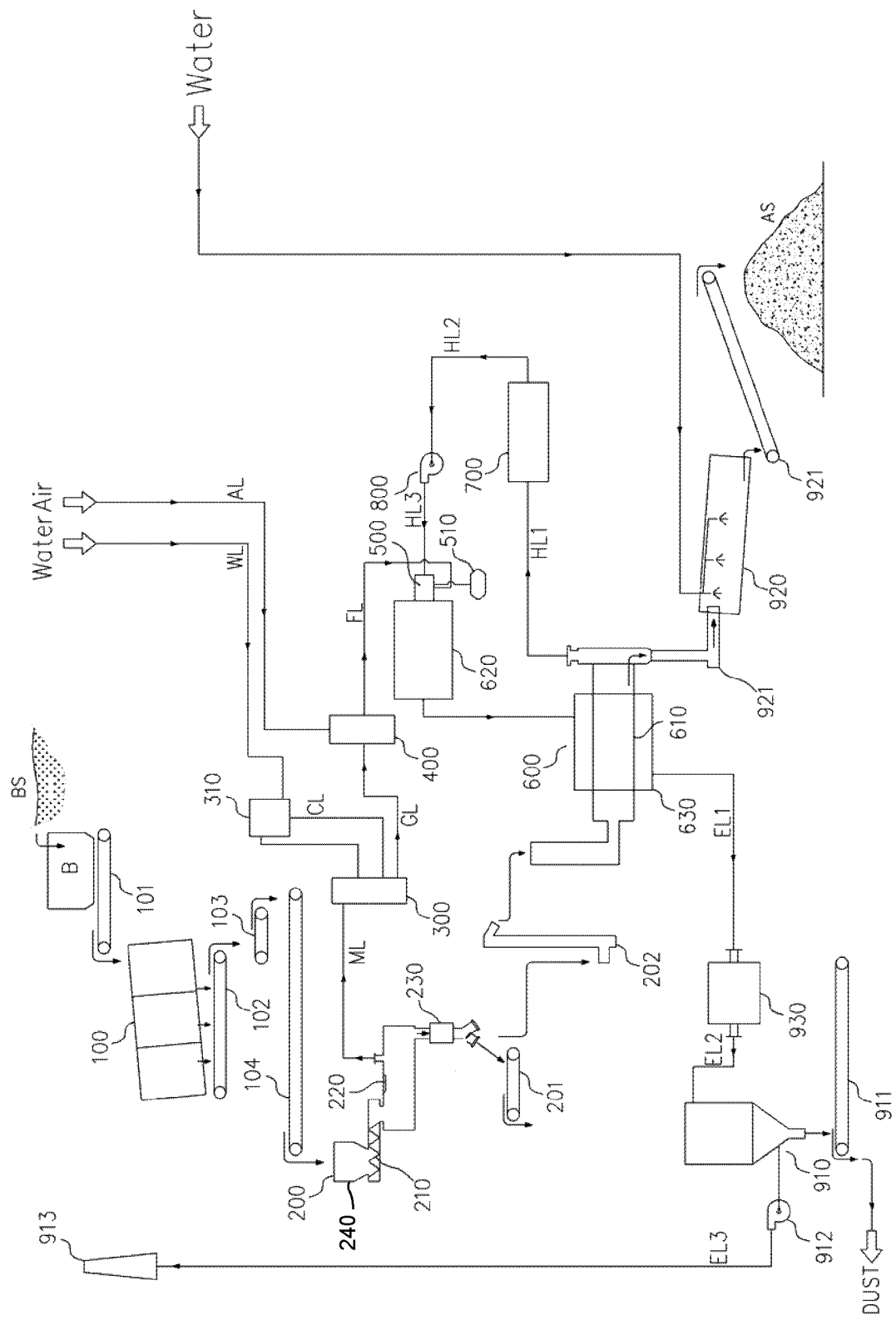
FIG. 1 is a schematic view showing a system for purifying contaminated soil, according to the present invention.

FIG. 1 is a schematic view showing a system for purifying contaminated soil, according to the present invention.

The contaminated soil purification system according to the present invention comprises a dryer 200 for drying contaminated soil to remove moisture, a burner 500 for heating air by oxidizing volatile organic compounds, which are waste gas generated during the drying of the contaminated soil, a pyrolysis apparatus 600 for indirectly heating the contaminated soil passed through the dryer 200 using air heated by the burner 500, and a transfer fan 800 for forcibly transferring pyrolysis gas (volatile organic compound), which has been removed from the contaminated soil by the indirect heating in the pyrolysis apparatus 600, to the burner 500. For the improvement of purification efficiency, the contaminated soil purification system may comprise a condenser 300 and a composition ratio control unit 400, as required.

The contaminated soil purification system, which is constructed in the above-describe manner, functions to purify soil contaminated by a variety of organic compounds. Since the burner 500 is intended to indirectly heat contaminated soil to a high temperature of about 780° C., the contaminated soil, which is the subject matter to be purified, is not oxidized. Furthermore, since the removed pyrolysis gas is also indirectly heated in a heating chamber 610 having little ventilation, most of the pyrolysis gas is removed from the contaminated soil without being oxidized.

The construction of the contaminated soil purification system according to the present invention is now described in the sequence of the purification processes.

Contaminated soil BS, which is the subject matter to be purified, is stored in a temporary storage tank B to be ready for the purification processes.

The contaminated soil BS includes heavy (light) metals as well as the soil. Because the heavy (light) metals are separated from the soil at the pyrolysis apparatus 600, it is preferable that the heavy (light) metals be separated in advance for the improvement of purification efficiency. In addition, since the size of soil particles constituting the contaminated soil plays a critical role in the purification efficiency with respect to the combustion temperature of the pyrolysis apparatus 600, it is preferable to sort soil particles by size and to conduct purification processes for the respective sorted contaminated soil BS, in order to improve the purification efficiency.

To this end, the temporary storage tank B is transferred to a sorting apparatus 100 through a transfer facility 101, such as a transfer conveyor, and then the contaminated soil BS in the temporary storage tank B is put into the sorting apparatus 100, where the particles of contaminated soil are sorted by size or are separated from the heavy (light) metals.

Referring to FIG. 1, the particles in the contaminated soil BS are sorted by size using the sorting apparatus 100, and the contaminated soil is transferred to the dryer 200 through a plurality of transfer facilities 102, 103 and 104 such that they can be sorted manually.

The contaminated soil BS, which has been transferred from the sorting apparatus 100, is passed through the dryer 200 while moisture contained in the contaminated soil is removed. The moisture contained in the contaminated soil BS, which is present in the waste gas in the form of water vapor, hinders the complete combustion of waste gas in the burner 500, thus deteriorating purification efficiency. Accordingly, it is preferable that the moisture contained in the contaminated soil BS be completely separated. Consequently, as the contaminated soil BS passes through the dryer 200, residual moisture in the contaminated soil BS is minimized and a moisture content of pyrolysis gas generated at the pyrolysis apparatus 600 is thus minimized, thus enabling recombustion of the pyrolysis gas for recycling.

As the dryer 200, a variety of types are applicable depending on the manner of operation, and representative dryers may include a hot-air dryer, a vacuum dryer, a microwave dryer and the like.

Among these, an embodiment of the contaminated soil purification system according to the present invention adopts a microwave dryer.

Because the contaminated soil BS is comprised of relatively fine soil particles, there is insufficient ventilation between the outside and the inside of the contaminated soil BS. Therefore, a hot air dryer, which requires ventilation of the subject matter to be dried, is not suitable for drying contaminated soil BS.

Meanwhile, the adoption of the vacuum dryer is disadvantageous in terms of working efficiency and economic efficiency because the contaminated soil purification system involves repeated drying for a relatively large quantity of contaminated soil BS.

Accordingly, the contaminated soil purification system according to the present invention, which is adapted to be applied to the purification of a large quantity of contaminated soil BS, comprised of earth and sand, preferably employs a microwave dryer, which has various advantages such as energy savings, production cost savings, high-speed drying, minimization of labor, minimization of installation space, increase of dry fraction due to volume heating, homogenization of percentage moisture content and automation.

As shown in the drawing, the dryer 200 is comprised of a transfer part 210 and a microwave generating part 220, and may further include a dryness checking part 230 and a bypass 240, if required.

The transfer part 210 serves to forcibly transfer the contaminated soil BS introduced in the dryer 200 while rotating in a screw manner, and the microwave generating part 220 is provided in a drying chamber to dry the contaminated soil BS introduced in the drying chamber. For reference, the drying chamber may be provided with a conveyer, which slowly moves the contaminated soil BS transferred from the transfer part 210 while causing the contaminated soil to be sufficiently exposed to microwaves generated from the microwave generating part 220.

The contaminated soil BS, which has released a large amount of moisture while passing through the dryer 200, is transferred to the pyrolysis apparatus 600 through a transfer facility 202, and waste gas generated from the contaminated soil BS is sent toward the burner 500 along a line.

The waste gas, which has been transferred from the dryer 200, is used as fuel in the burner 500. Of course, the waste gas is completely burned and eliminated when used as fuel. Accordingly, it is preferable to optimize the flammability and burning efficiency of the waste gas transferred to the burner 500.

Although the waste gas, which has been transferred from the dryer 200, has considerably reduced water content, it still contains a small amount of moisture. This residual moisture hinders complete incineration in the burner 500, thus causing incomplete combustion.

Subsequently, the waste gas, which has been transferred from the dryer 200, is transferred to the condenser 300 along a mixed gas line ML, and the condenser 300 separates moisture from the waste gas.

The contaminated soil purification system according to the present invention adopts the condenser for the moisture removal. The condenser 300 condenses the waste gas, which has been supplied along the mixed gas line ML, and then the condensed water vapor is discharged, thus leaving only pure waste gas.

The condenser 300, which is heated to a high temperature upon the operation thereof, is cooled using cooling water. At this time, the necessary cooling water may be supplied from a cooling tower 310. For reference, the cooling tower 310 functions to receive water from the outside through a feed-water line WL, to cool the water, and to supply the cooled water to the condenser 300 through a cooling line CL connected to the condenser 300.

The waste gas in the condenser 300 can get oxygen (air), required for the combustion of the waste gas, in the course of being transferred to the burner 500 through a waste line GL.

The composition ratio control unit 400 is adapted to mix the waste gas, transferred through the waste line GL, with the oxygen (air) transferred through an air supply line AL, and creates conditions required for complete combustion in the burner 500. Generally, in order to realize complete combustion of the waste gas, the waste gas and the oxygen (air) must be mixed in the ideal ratio. The composition ratio control unit 400 checks the composition ratio of the waste gas transferred through the waste gas line GL. As a result of the checking, when an oxygen (air) ratio does not satisfy the ideal ratio, the ratio of the oxygen (air) and the waste gas is controlled by adjusting the supply of the oxygen (air).

The waste gas, the composition ratio of which has been controlled, is supplied to the burner 500 along a combustion gas line FL.

Meanwhile, the contaminated soil BS, which has been dried by the dryer 200 and has released moisture, is transferred to the pyrolysis apparatus 600 through the transfer facility 202. At this point, when the contaminated soil BS has not been sufficiently dried, moisture content above a specified value may remain in the contaminated soil BS.

Accordingly, before the dried contaminated soil BS is transferred to the pyrolysis apparatus 600, the dryness of the contaminated soil BS is checked. As a result of the checking, if moisture content above the specified value is found to remain, the contaminated soil BS is dried again. To this end, the dryer 200 is provided at the outlet port thereof with the dryness checking part 230 and the bypass 240, and one end of the bypass 240 is connected to the transfer facility 202 leading to the pyrolysis apparatus 600, whereas the other end of the bypass 240 is connected to the transfer facility 201 leading to the starting point of the dryer 200.

More specifically, the dryness checking part 230 measures the moisture content of the contaminated soil BS discharged from the dryer 200, and determines whether the moisture content exceeds the specified value based on the measurement. Herein, as the technique for measuring moisture content is well known in the art, a detailed description of the dryness checking part 230 is omitted.

As a result of the determination at the dryness checking part 230, when the moisture content of the dried contaminated soil BS is less than the specified value, the other end of the bypass 240 is closed while only one end of the bypass 240 is opened so as to allow the contaminated soil BS to be introduced into the pyrolysis apparatus 600. When the moisture content of the contaminated soil BS exceeds the specified value, the one end of the bypass 240 is closed while only the other end of the bypass 240 is opened so as to allow the contaminated soil BS to be introduced into the transfer facility 201.

The transfer facility 201 may be directly connected to the dryer 200, or may be connected to a separate collecting tank (not shown) so that a drying operation can be further conducted later.

Ultimately, the contaminated soil BS, which contains moisture content above the specified value, is repeatedly subjected to the drying operation two or more times until the moisture content is within the range of the specified value.

The dried contaminated soil BS is transferred to the pyrolysis apparatus 600 through the transfer facility 202, and the pyrolysis apparatus 600 is heated by heat, which is generated by complete combustion of the waste gas in the burner 500, thus heating the contaminated soil BS.

For this purpose, the pyrolysis apparatus 600 may comprise a heating chamber 610 which hermetically holds the contaminated soil BS, and first and second heating furnaces 620 and 630, which are adapted to heat the heating chamber 610 using the hot air passing therethrough.

In a preferred embodiment, the heating chamber 610 is rotatably installed in the second heating furnace 630, so that the contaminated soil BS is homogeneously heated while being stirred. As a consequence, the contaminated soil BS is effectively divided into purified soil and pyrolysis gas.

The resulting pyrolysis gas is again transferred to the burner 500 through pyrolysis gas lines HL1, HL2 and HL3, and is mixed with the waste gas transferred through the combustion gas line FL and is incinerated.

The first heating furnace 620 is provided therein with the burner 500 to heat air existing in the first heating furnace 620 to a high temperature, and the second heating furnace 630 is adapted to communicate with the first heating furnace 620 to allow heated air to be supplied thereto. Consequently, air heated by the first heating furnace 620 is introduced into the second heating furnace 630, thus heating the heating chamber 610. As a result, the contaminated soil BS in the heating chamber 610 is indirectly heated, thus allowing pyrolysis gas to escape.

Alternatively, without the need for the provision of the separate first and second heating furnaces 620 and 630, the burner 500 may be directly installed at the second heating furnace 630 so as to heat air required for the indirect heating of the heating chamber 610.

Because the contaminated soil BS is heated at a high temperature in the pyrolysis apparatus 600, the pyrolysis gas may be partially oxidized, resulting in the inclusion of carbide. For this reason, in order to assure the complete combustion of the waste gas and the pyrolysis gas in the burner 500, a foreign material removal unit 700, which serves to remove powder dust, is mounted on the pyrolysis gas lines HL1, HL2 and HL3. In this case, the foreign material removal unit 700 may be embodied as a centrifugal dust collector, and may further be embodied as a gas washer for spraying water to remove foreign material contained in the pyrolysis gas, a filter dust collector for separating powder dust contained in the pyrolysis gas, an activated carbon filter for removing foreign material remaining in the pyrolysis gas, and the like. In other words, the foreign material removal unit 700 may be embodied in any various forms without departing from the scope of the present invention as long as it can remove foreign materials, such as inert material, environmental pollutants and the like, and thus purify the pyrolysis gas into a state in which complete combustion is possible.

The pyrolysis gas, which has undergone the stage of removal of foreign material, is again forcibly transferred through the transfer fan 800 to the first heating furnace 610, in which the burner 500 is mounted. The transfer fan 800 is adapted to efficiently blow the pyrolysis gas separated from the pyrolysis apparatus 600, and to supply an appropriate amount of pyrolysis gas so as to allow the continuous burning operation of the burner 500.

As a result, the burner 500 burns mixed gas of the waste gas, which is supplied through the combustion gas line FL, and the pyrolysis gas supplied through the pyrolysis gas lines HL1, HL2 and HL3.

The burner 500 further includes an auxiliary fuel tank 510, which is used to drive the burner 500. The auxiliary fuel tank 510 serves to supply fuel, required for initial ignition, to the burner 500. That is, when the combustion temperature of the burner 500 is lowered, the auxiliary fuel tank 510 separately supplies fuel to compensate for the lowered temperature.

Subsequently, purified soil AS, which is a product resulting from the thermal decomposition in the pyrolysis apparatus 600, is discharged outside through a transfer facility. However, since the purified soil AS, which has just been discharged from the pyrolysis apparatus 600, has a high temperature, to expose the purified soil AS to the outside without delay is somewhat dangerous. Accordingly, it is preferable that the purified soil AS, which has been discharged from the pyrolysis apparatus 600, be transferred to a separate cooling facility 920 where it is cooled, and then be discharged to the outside.

Although the cooling facility 920 may be operated in any various manner, such as an air-cooling manner and a water-cooling manner, the cooling facility 920 of the contaminated soil purification system according to the present invention is preferably operated in the water-cooling manner. The water-cooling type cooling facility 920 is preferably operated in a manner such that a spraying device, such as a sprinkler, sprays cooling water from above on the purified soil AS over a large area. The spraying is conducted to prevent the purified soil AS, which is in a dried and heated state, from flying or splashing as earth, sand or dust, thus preventing the unnecessary spreading of the purified soil AS.

The cooling facility 920 may further include a transfer part 921, which is adapted to transfer the purified soil AS in a screw manner, so as to improve a transfer efficiency of the purified soil AS discharged from the pyrolysis apparatus 600.

The exhaust gas from the burner 500, which has been used to heat the heating chamber 610 of the pyrolysis apparatus 660, is discharged outside through exhaust lines EL1, EL2 and EL3.

Meanwhile, because the exhaust gas is a product resulting from the combustion of waste gas and pyrolysis gas, which are contaminated materials, it may contain some powder dust and/or ash. Accordingly, before being discharged to the outside, the exhaust gas is preferably passed through a filter 910, which filters out powder dust and ash, and is then discharged through a chimney to the outside at a high altitude. Of course, in order to improve the discharge efficiency of the exhaust gas passing through the chimney 913, the exhaust gas, which has been passed through the filter 910, may be compressed.

The powder dust and/or ash, which are filtered by the filter 910, are separately collected through a transfer facility 911 and are separately disposed. The exhaust gas, which has been passed through the filter 910, is compressed using a separate drainage device 912, such as a drainage pump.

Since the exhaust gas remains at a high temperature even after being discharged from the pyrolysis apparatus 600, it is economical to utilize the high-temperature energy in other applications. For example, the high-temperature energy may be utilized to drive a waste boiler 930, which is used to heat a room and water, and the waste boiler 930 may serve to improve indoor conditions in the space in which the contaminated soil purification system according to the present invention is installed.

However, the reutilization of the exhaust gas is not necessary restricted to the above-mentioned application, and may be applied to various uses, if necessary.

As described above, the contaminated soil-purifying system according to the present invention is configured to dry contaminated soil, thus reducing the moisture content of the soil, and is also configured to directly heat the contaminated soil in a heating chamber, thus purifying the contaminated soil by division of the contaminated soil into purified soil and volatile organic compounds. Consequently, the volatile organic compounds, having low moisture content, can be reused as an energy source required for the pyrolysis of contaminated soil, thus improving the purification and operating efficiencies of the contaminated soil purification system.

Figure 2:
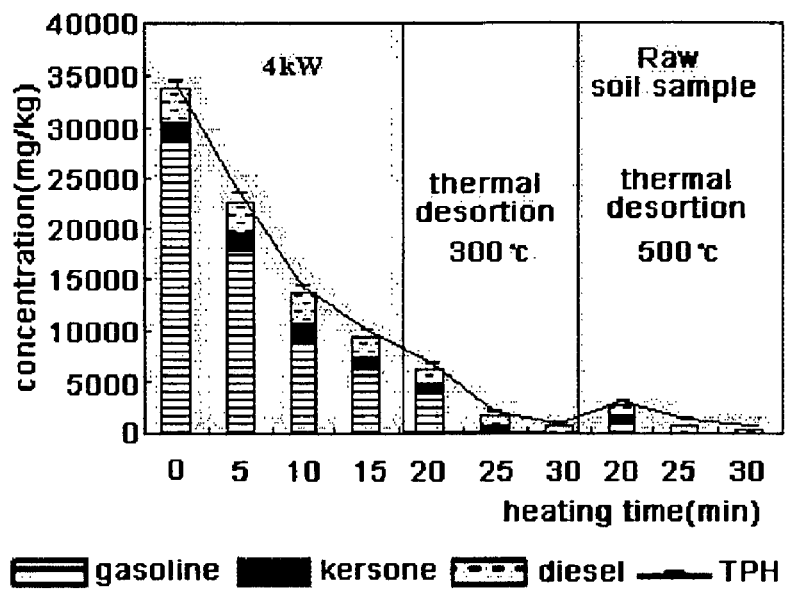
FIG. 2 is TPH concentration on different type of petroleum in raw soil sample by combined process of microwave at 4 kW and thermal desorption.
Figure 3:
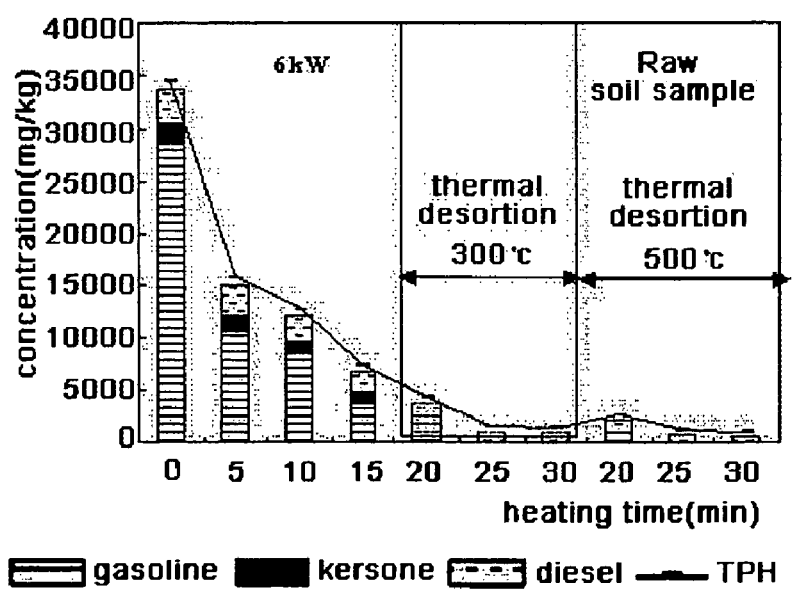
FIG. 3 is TPH concentration on different type of petroleum in raw soil sample by combined process of microwave at 6 kW and thermal desorption.

FIG. 2 is TPH concentration on different type of petroleum in raw soil sample by combined process of microwave at 4 kW and thermal desorption, and FIG. 3 is TPH concentration on different type of petroleum in raw soil sample by combined process of microwave at 6 kW and thermal desorption.

There are some methods to treat the contaminated soil; bioremediation, incineration method, low temperature thermal desoption (LTTD). Among these, LTTD can treat the soil in short time and its efficiency has been proved. However, In case of its moisture content being more than 20%, a pretreatment is necessary because the process efficiency of LTTD deteriorates. So we choose microwave as pretreatments to remove the moisture on the soil. In case that the contaminated soil containing water of 30 percentages was treated by LTTD without microwave treatment (Retention time: 30 minute); 47% TPH was removed at 300° C., 54% TPH was done at 400° C. and 63% TPH was done at 500° C. From above result, there was no great difference removal rate with temperature. In case of treating the contaminated soil containing water of 30% with LTTD process combined with microwave process (Retention time: 20 minute), TPH of 60% in microwave was removed. The combined process of TPH removal showed that TPH of about 97% was removed at 300° C. and that of about 98% was done at 500° C. In case of treating the soil with microwave process of 6 kW combined with LTTD process, TPH of 77% was removed. From LTTD at 300° C., TPH of 97% was removed and, from the desorption process at 500° C., TPH of 98% was done. In case that didn't use microwave, the removal rate of LTTD showed 30%~50% lower efficiency than the rate by microwave process linked with low temperature thermal desorption.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A system for purifying contaminated soil, comprising:
a dryer which dries contaminated soil, separates waste gas generated during the drying from the contaminated soil, and discharges the waste gas;
a pyrolysis apparatus which indirectly heats the dried contaminated soil in a hermetic condition to divide the contaminated soil into purified soil and pyrolysis gas, and separately discharges the purified soil and the pyrolysis gas;
a transfer fan for forcibly transferring the discharged pyrolysis gas;
a burner for oxidizing the waste gas discharged from the dryer and the pyrolysis gas forcibly transferred from the transfer fan, to heat the pyrolysis apparatus; and
a cooling facility for directly spraying cooling water on the discharged purified soil to cool the purified soil,
wherein the dryer comprises:
a dryness checking part for measuring a moisture content of the dried contaminated soil; and
a bypass through which the dried contaminated soil is discharged, and which is connected at one end thereof to the pyrolysis apparatus and is connected to the dryer so as to control a discharge direction of the contaminated soil, in which, as a result of checking a moisture content of the contaminated soil discharged through the dryer using the dryness checking part, another end of the bypass is closed while the one end of the bypass is opened when the checked moisture content is determined to be less than a specified value, and the one end of the bypass is closed while the other end of the bypass is opened when the checked moisture content is determined to be greater than the specified value, thus controlling the discharge direction of the contaminated soil.

2. The system according to claim 1, wherein the dryer is a microwave dryer which radiates microwaves on the contaminated soil to dry the contaminated soil.

3. The system according to claim 1, further comprising a condenser which condenses the waste gas discharged from the dryer to liquefy and separate residual moisture.

4. The system according to claim 3, further comprising a composition ratio control unit, which mixes the waste gas discharged from the condenser with outside air to control a composition ratio of the waste gas.

5. The system according to claim 1, wherein the pyrolysis apparatus comprises:
    a heating chamber which rotates and thus stirs the contaminated soil transferred from the dryer; and
    at least one heating furnace which hermetically encloses the heating chamber, and into which heating air is introduced.

\* \* \* \* \*